(12) United States Patent
Kim et al.

(10) Patent No.: US 12,044,145 B2
(45) Date of Patent: Jul. 23, 2024

(54) CMC LAMINATE AIRFOIL WITH PLY DROPS

(71) Applicant: RAYTHEON TECHNOLOGIES CORPORATION, Farmington, CT (US)

(72) Inventors: Russell Kim, Glastonbury, CT (US); Howard J. Liles, Newington, CT (US); Kathryn S. Read, Marlborough, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/319,586

(22) Filed: May 18, 2023

(65) Prior Publication Data

US 2023/0383657 A1 Nov. 30, 2023

Related U.S. Application Data

(60) Provisional application No. 63/346,427, filed on May 27, 2022.

(51) Int. Cl.
*F01D 5/28* (2006.01)
*F01D 5/14* (2006.01)

(52) U.S. Cl.
CPC ............ *F01D 5/282* (2013.01); *F01D 5/147* (2013.01); *F01D 5/284* (2013.01); *F05D 2300/6012* (2013.01); *F05D 2300/6033* (2013.01); *F05D 2300/6034* (2013.01)

(58) Field of Classification Search
CPC .. F01D 5/282; F01D 5/284; F05D 2300/6012; F05D 2300/6033; F05D 2300/6034
See application file for complete search history.

(56) References Cited

U.S. PATENT DOCUMENTS

| | | | | |
|---|---|---|---|---|
| 5,110,652 | A * | 5/1992 | Allaire | C03C 14/002 428/113 |
| 6,736,919 | B1 | 5/2004 | Roebroeks | |
| 7,600,979 | B2 * | 10/2009 | Steibel | C04B 35/573 416/229 A |
| 9,011,085 | B2 * | 4/2015 | Suciu | F01D 9/041 29/889.22 |
| 10,174,627 | B2 | 1/2019 | Chang et al. | |

(Continued)

OTHER PUBLICATIONS

European Search Report for European Patent Application No. 23174135.6 mailed Oct. 19, 2023.

*Primary Examiner* — Michael L Sehn
(74) *Attorney, Agent, or Firm* — Carlson, Gaskey & Olds, P.C.

(57) ABSTRACT

An airfoil includes an airfoil section that has an airfoil wall that circumscribes an internal airfoil cavity and defines leading and trailing ends and pressure and suction sides. The airfoil wall is formed of a ceramic matrix composite (CMC) laminate comprised of fiber plies disposed in a ceramic matrix. The fiber plies include a skin fiber ply that defines an exterior of the airfoil section and at least one inner fiber ply that lines the skin fiber ply. At least one inner fiber ply locally terminates at one of the leading end or the trailing end such that the airfoil wall has fewer of the fiber plies in the leading end or the trailing end than in each of the pressure side and the suction side.

12 Claims, 4 Drawing Sheets

(56) References Cited

U.S. PATENT DOCUMENTS

| | | | |
|---|---|---|---|
| 10,309,242 B2 * | 6/2019 | Frey | C04B 35/80 |
| 10,408,084 B2 * | 9/2019 | Thomas | F01D 9/065 |
| 10,443,410 B2 | 10/2019 | de Diego et al. | |
| 10,533,432 B2 * | 1/2020 | Kittleson | F01D 5/284 |
| 2011/0143082 A1 | 6/2011 | Fritz et al. | |
| 2014/0065372 A1 | 3/2014 | Olson | |
| 2018/0216477 A1 | 8/2018 | Kittleson et al. | |
| 2018/0370158 A1 | 12/2018 | Gallier et al. | |
| 2020/0049160 A1 | 2/2020 | Pope | |
| 2020/0149423 A1 | 5/2020 | Farrar et al. | |

\* cited by examiner

CMC LAMINATE AIRFOIL WITH PLY DROPS

CROSS-REFERENCE TO RELATED APPLICATION

The present disclosure claims priority to U.S. Provisional Application No. 63/346,427 filed May 27, 2022.

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil according to an example of the present disclosure includes an airfoil section that has an airfoil wall that circumscribes an internal airfoil cavity and defines leading and trailing ends and pressure and suction sides. The airfoil wall is formed of a ceramic matrix composite (CMC) laminate comprised of fiber plies disposed in a ceramic matrix. The fiber plies include a skin fiber ply that defines an exterior of the airfoil section and at least one inner fiber ply lining the skin fiber ply. The at least one inner fiber ply locally terminates at one of the leading end or the trailing end such that the airfoil wall has fewer of the fiber plies in the leading end or the trailing end than in each of the pressure side and the suction side.

In a further embodiment of any of the foregoing embodiments, the at least one inner fiber ply includes an inner-most fiber ply.

In a further embodiment of any of the foregoing embodiments, the skin fiber ply circumscribes the internal airfoil cavity.

In a further embodiment of any of the foregoing embodiments, the at least one inner fiber ply has a first terminal end in the pressure side and a second terminal end in the suction side.

In a further embodiment of any of the foregoing embodiments, the first terminal end and the second terminal end are at an equivalent chord length position.

In a further embodiment of any of the foregoing embodiments, the at least one inner fiber ply includes multiple, non-consecutive fiber plies locally terminating at one of the leading end or the trailing end.

In a further embodiment of any of the foregoing embodiments, at a radial end of the airfoil section one or more of the fiber plies are turned out and form a platform.

In a further embodiment of any of the foregoing embodiments, one or more of the fiber plies have a braided or woven fiber configuration.

A gas turbine engine according to an example of the present disclosure includes a compressor section, a combustor in fluid communication with the compressor section, and a turbine section in fluid communication with the combustor. The turbine section has airfoils according to any of the foregoing embodiments.

In a further embodiment of any of the foregoing embodiments, there are at least four of the fiber plies, and the at least one inner fiber ply includes an inner-most fiber ply.

In a further embodiment of any of the foregoing embodiments, the skin fiber ply circumscribes the internal airfoil cavity.

In a further embodiment of any of the foregoing embodiments, the at least one inner fiber ply has a first terminal end in the pressure side and a second terminal end in the suction side.

In a further embodiment of any of the foregoing embodiments, the first terminal end and the second terminal end are at an equivalent chord length position.

In a further embodiment of any of the foregoing embodiments, the at least one inner fiber ply includes multiple, non-consecutive fiber plies locally terminating at one of the leading end or the trailing end.

In a further embodiment of any of the foregoing embodiments, at a radial end of the airfoil section one or more of the fiber plies are turned out and form a platform.

In a further embodiment of any of the foregoing embodiments, one or more of the fiber plies have a braided or woven fiber configuration.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
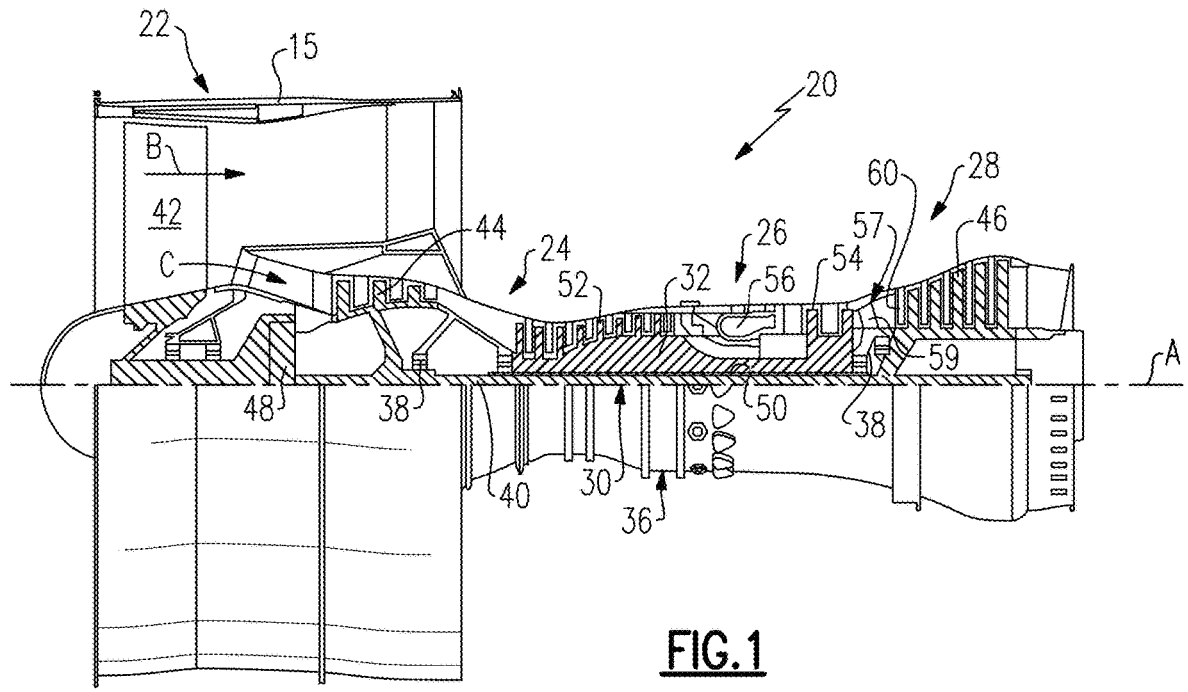
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
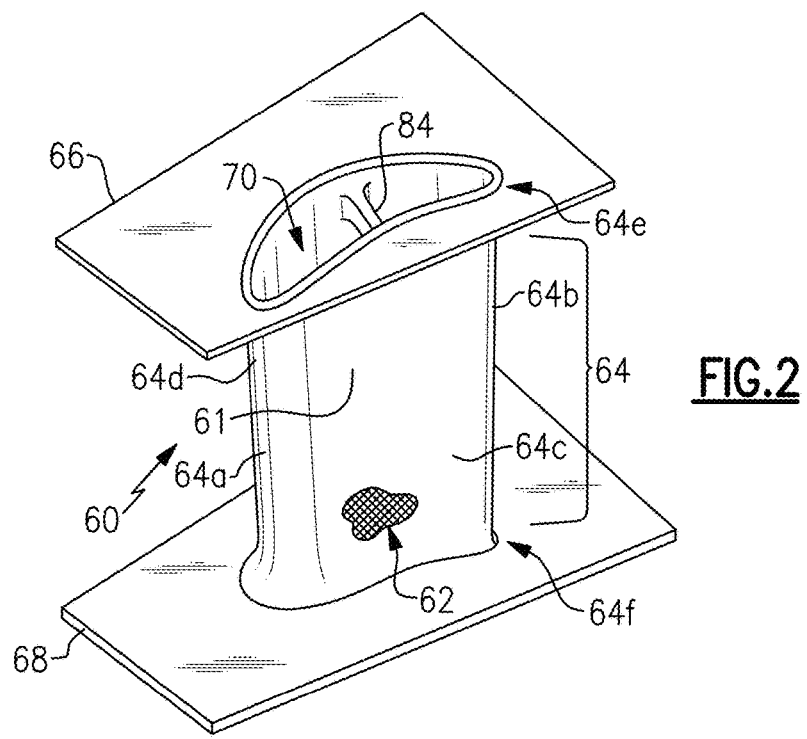
FIG. 2 illustrates an airfoil from the engine.

FIG. 2 illustrates an example airfoil 60 from the turbine section 28 of the engine 20. In this example, the airfoil 60 is a vane that is supported between inner and outer support hardware, and there are multiple vanes arranged in a circumferential row in the engine 20. It is to be understood that although the examples herein may be discussed in context of a vane from the turbine section 28, the examples can be applied to turbine blades or other types of airfoils in other portions of the engine 20.

The airfoil 60 has an airfoil wall 61 that is formed of a ceramic matrix composite (CMC) laminate 62, a portion of which is shown in partial cutaway view. The CMC laminate 62 is a multi-layer structure (see FIG. 3) in which each layer has fiber plies 72 that contain ceramic fiber tows that are disposed in a ceramic matrix. As an example, the CMC laminate 62 may be, but is not limited to, a SiC/SiC composite in which SiC fiber plies are disposed within a SiC matrix. Each of the fiber plies 72 has a fiber configuration, which refers to an ordered arrangement of the fiber tows relative to one another, such as a 2D woven configuration (e.g., 8 harness satin weave, 5 harness satin weave, or plain weave) or braided configuration (e.g., bi- or tri-axial braid). The fiber plies 72 in the CMC laminate 62 are all of the same fiber configuration but alternatively one or more of the fiber plies 72 may have a different fiber configuration in order to obtain different properties. Thus, the fiber plies 72 may collectively contain one, two, or more than two fiber configurations.

Figure 3:
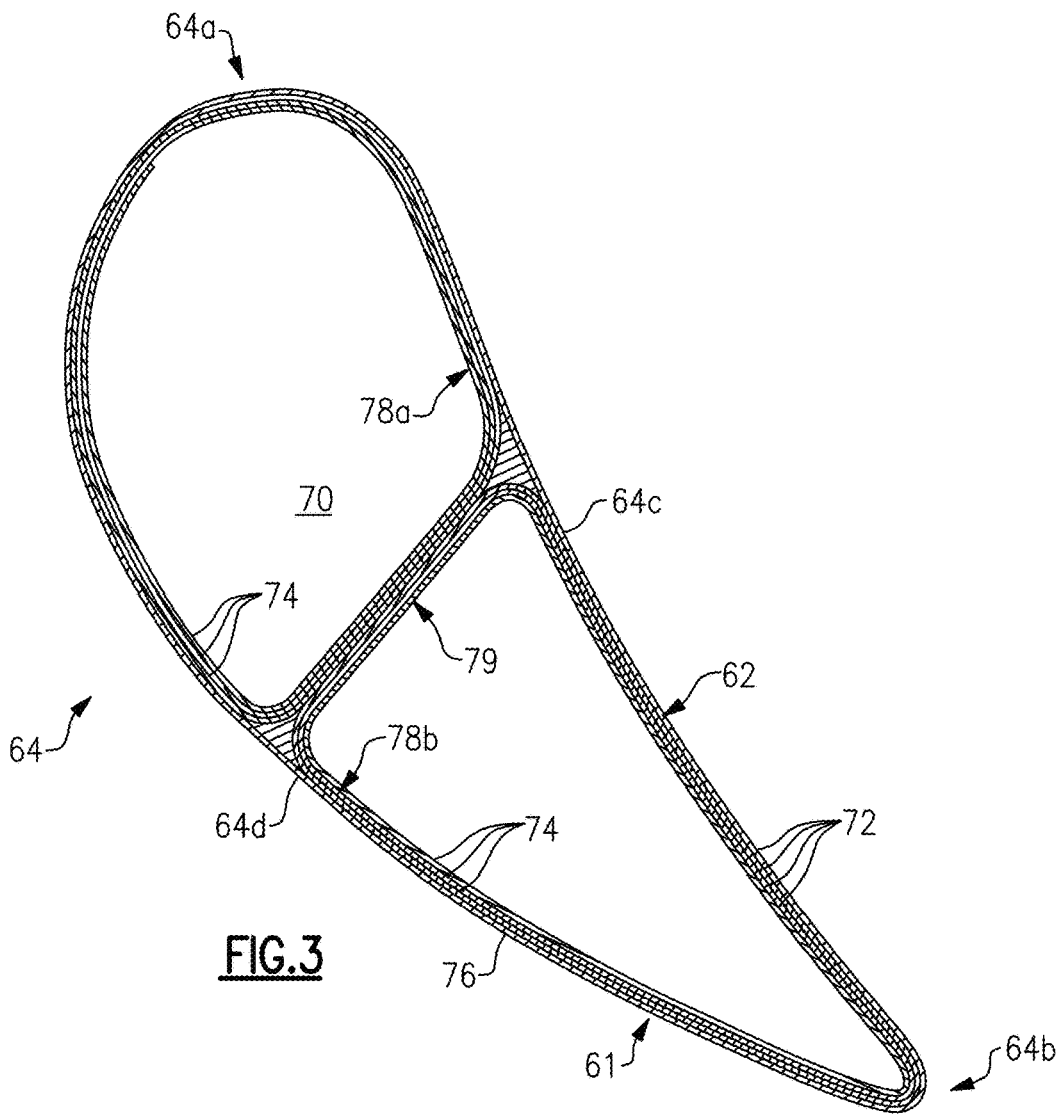
FIG. 3 illustrates a sectioned view of the airfoil.

In the illustrated example, the airfoil 60 is comprised of an airfoil section 64 and first and second platforms 66/68 between which the airfoil section 64 extends. The airfoil 60 is of continuous construction in that at least one or more of the fiber plies 72 extends uninterrupted through the platform 66, the airfoil section 64, and the platform 68. Referring also to FIG. 3 that shows a sectioned view through the airfoil section 64 along a plane that is orthogonal to the radial direction through the airfoil 60, the airfoil section 64 circumscribes an internal cavity 70 and defines leading and trailing ends 64a/64b and first and second sides 64c/64d that join the leading and trailing ends 64a/64b. In this example, the first side 64c is a pressure side and the second side 64d is a suction side. The airfoil section 64 spans radially, relative to the central engine axis A, between a first (outer) radial end 64e to a second (inner) radial end 64f. The terms such as "inner" and "outer" refer to location with respect to the central engine axis A, i.e., radially inner or radially outer. Moreover, the terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

The fiber plies 72 of the CMC laminate 62 include one or more inner fiber plies 74 that internally line a skin fiber ply 76. The skin fiber ply 76 defines the exterior of the airfoil section 64, although the exterior surface of the skin fiber ply 76 may have an environmental and/or thermal barrier coating that is/are known to those of ordinary skill in the art. The inner fiber plies 74 are bonded as a stacked arrangement to the interior side of the skin fiber ply 76. Although the airfoil wall 61 has four of the fiber plies 72 in the examples shown, it is to be understood additional or fewer fiber plies 72 may be used, such a three, five, eight, or ten of the fiber plies 72. In the illustrated example there are two sets of inner fiber plies 74, which are arranged as, respectively, first and second radial tubes 78a/78b. The first tube 78a is a forward tube that circumscribes a forward sub-cavity of the internal cavity 70, and the second tube 78b is an aft tube that circumscribes an aft sub-cavity of the internal cavity 70. The tubes 78a/78b form a rib 79 there between. It is to be appreciated that one or more additional sets of inner fiber plies 74 and tubes could be used, or only a single set of inner fiber plies 74 and a single tube (no rib). The skin fiber ply 76 wraps around the inner fiber plies 74 and extends continuously along the first side 64c, around the leading end 64a, and along the second side 64d before terminating in the trailing end 64b. Thus, the skin fiber ply 76 completely encompasses the inner fiber plies 74.

In general, CMC has significantly lower thermal conductivity than superalloys and does not possess the same strength and ductility characteristics, making it more susceptible to distress from thermal gradients and the thermally induced stresses those cause. The high strength and toughness of superalloys permits resistance to thermal stresses, whereas by comparison CMCs are more prone to distress from thermal stress. Thermal stresses may cause distress at relatively weak locations, such as along interlaminar interfaces between fiber plies or in fillets between wall sections.

For these reasons a leading end of an airfoil is particularly challenging to the use of CMCs. The leading end typically has a small radius of curvature that can concentrate stresses on the internal surface. Moreover, external gas path temperatures at the leading end are extremely high. Therefore, internal cooling of the leading end can cause thermal gradients that may exacerbate interlaminar stresses. In these regards, as will be discussed below, the fiber plies 72 of the airfoil 60 are configured to facilitate mitigation of stress concentrations and thermal gradients.

Figure 4:
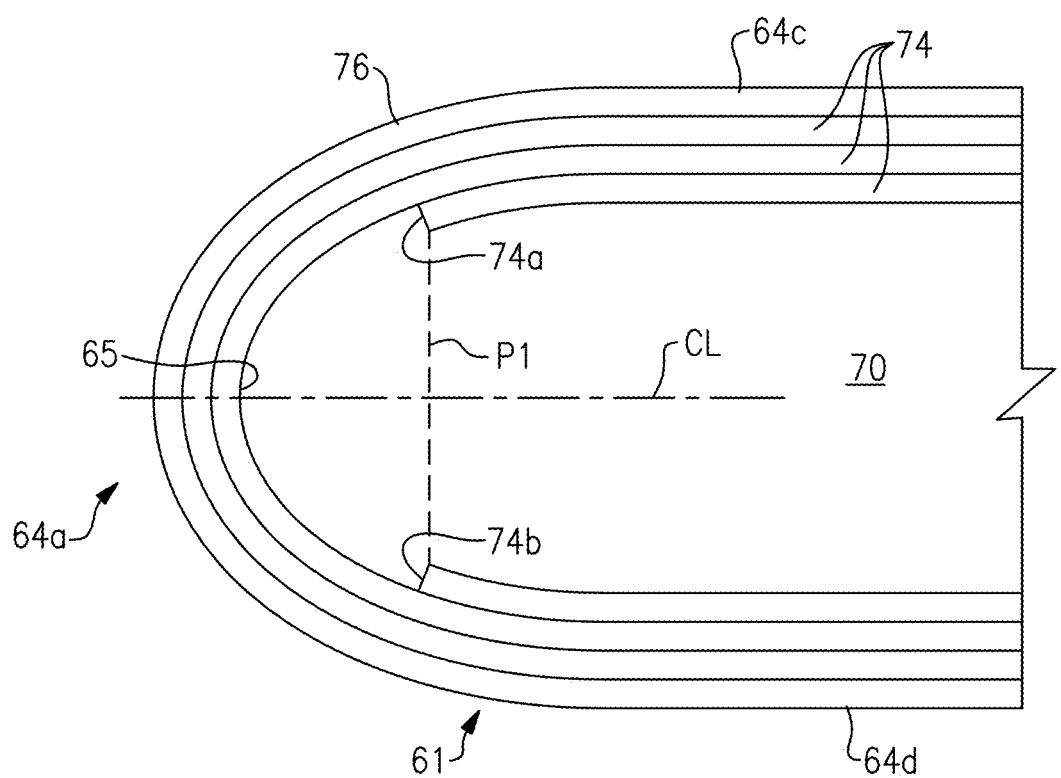
FIG. 4 illustrates a sectioned view in the region of the leading end of the airfoil.

FIG. 4 illustrates a sectioned-view from the region of the leading end 64a and partially along the sides 64c/64d. It is to be appreciated, however, that the example is also representative of the trailing end 64b. In this example, the inner-most one of the inner fiber plies 74 (that borders the cavity 70) locally terminates at the leading end 64a such that the airfoil wall 61 has fewer of the fiber plies 72 in the leading end 64a than in each of the sides 64c/64d. The inner-most one of the inner fiber plies 74 locally terminates at respective first and second terminal ends 74a/74b such that there is no fiber ply in the volume along the leading end 64a that the inner-most ply would have otherwise occupied if it continued without termination. Such terminations may also be referred to as ply drops.

The local termination of the inner-most one of the fiber plies 72 in the leading end 64a eliminates the portion of the fiber ply 72 that would otherwise have a relatively small radius of curvature in comparison to the other, outer ones of the fiber plies 72. That is, from the exterior of the airfoil wall 61 toward the interior, the fiber plies 72 must turn at a successively smaller radii. Thus, elimination of a portion the inner-most one of the fiber plies 72 in the leading end 64a eliminates a small-radius bend, thereby in effect increasing the radius at the internal surface 65 of the airfoil wall 61 in the leading end 64a. The effective increase in radius facilitates a decrease in interlaminar stresses that would otherwise occur due to the geometric shape of a small radius. Additionally, the reduced through-thickness of the airfoil wall 61 in the leading end 64a facilitates a local decrease of the thermal gradient to reduce the thermally driven component of the interlaminar stress. Moreover, while the thickness is decreased in the leading end 64a, the full thickness is maintained around the remainder of the airfoil wall 61.

Figure 4A:
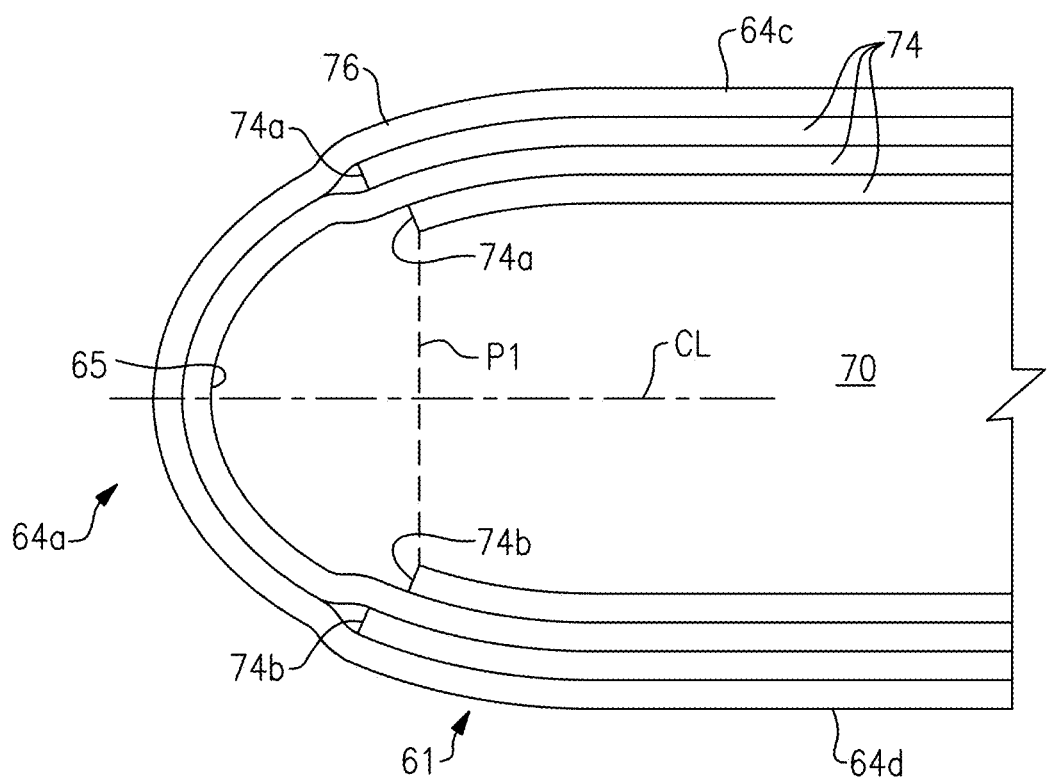
FIG. 4A illustrates a sectioned view in the region of the leading end of the airfoil.

An additional effective increase in radius and reduction in wall thickness may be achieved by locally terminating one or more additional successive fiber plies 72 from the inner-most one of the fiber plies 72. That is, the next inner ply or plies 72 from the inner-most ply may be locally terminated in a similar manner as the inner-most ply. The termination of the inner-most ply 72 may result in increased hoop stress, however, the hoop strength of the CMC is significantly higher than the interlaminar strength. In other examples, the one or more of the fiber plies 72 that are not the inner-most include a ply drop. For instance, the second-inner-most one of the fiber plies 72 includes a ply drop. In this case, the inner-most one of the fiber plies drapes into the void region of the ply drop. Such a configuration avoids having the terminated ends of the inner-most one of the fiber plies 72 exposed in the internal cavity 70. In further examples, such as shown in FIG. 4A, one or more additional, non-consecutive ones of the fiber plies 72 may include ply drops 74a/74b, with the next-inner-most one of the fiber plies 72 draping into the void created by the ply drop.

The number of terminated fiber plies and the locations of the first and second terminal ends 74a/74b can be optimized to balance interlaminar stress and hoop strength. For example, relative to chord line CL, the terminal ends 74a/74b are at an equivalent chord length position P1, which may be represented at a percentage of the full chord length from the leading end 64a to the trailing end 64b. As an example, the position P1 is within the first 10% length of the chord line.

Figure 5:
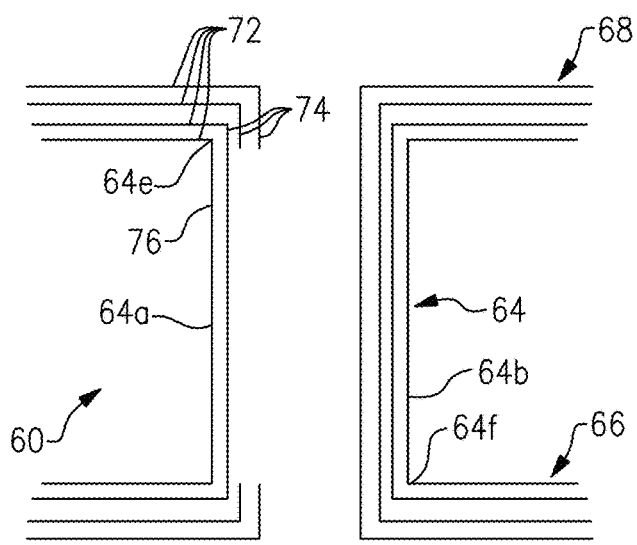
FIG. 5 illustrates a view of fiber plies of an airfoil.

FIG. 5 illustrates a further example of the airfoil 60 that shows the fiber plies 72. In this example, the two inner-most ones of the inner fiber plies 74 are locally terminated at the leading end 64a. At each radial end 64e/64f of the airfoil section 64, the fiber plies 72, including the inner fiber plies 74 that are locally terminated, are turned out to form the platforms 66/68. Cutting, darting, and other techniques for manipulating the folding of the fiber plies 72 may be used to assist. Thus, although there are fewer of the fiber plies 72 in the leading end 64a, all of the fiber plies 72 are in the platforms 66/68. Alternatively, if performance and geometry requirements permit, the termination of the inner fiber plies 74 may be extended through the platforms 66/68. For example, the termination may facilitate the bending of the fiber plies 72 to form the platforms 66/68. In this regard, the fiber configuration of one of more of the fiber plies 72 may be selected to facilitate facile bending. For instance, harness or plain weaves have a more open fiber spacing in comparison to braided configuration, which may provide the fiber tows space to move relative to one another to accommodate bending.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil section having an airfoil wall circumscribing an internal airfoil cavity and defining leading and trailing ends and pressure and suction sides, the airfoil wall being formed of a ceramic matrix composite (CMC) laminate comprised of fiber plies disposed in a ceramic matrix, the fiber plies including a skin fiber ply defining an exterior of the airfoil section and at least one inner fiber ply lining the skin fiber ply, the at least one inner fiber ply locally terminating at the leading end such that the airfoil wall has fewer of the fiber plies in the leading end than in each of the pressure side and the suction side, and the at least one inner fiber ply including multiple, non-consecutive fiber plies locally terminating at the leading end.

2. The airfoil as recited in claim 1, wherein the at least one inner fiber ply includes an inner-most fiber ply.

3. The airfoil as recited in claim 1, wherein the skin fiber ply circumscribes the internal airfoil cavity.

4. The airfoil as recited in claim 1, wherein the at least one inner fiber ply has a first terminal end in the pressure side and a second terminal end in the suction side.

5. The airfoil as recited in claim 4, wherein the first terminal end and the second terminal end are at an equivalent chord length position.

6. The airfoil as recited in claim 1, wherein at a radial end of the airfoil section one or more of the fiber plies are turned out and form a platform.

7. The airfoil as recited in claim 1, wherein one or more of the fiber plies have a braided or woven fiber configuration.

8. A gas turbine engine comprising:
a compressor section;
a combustor in fluid communication with the compressor section; and
a turbine section in fluid communication with the combustor, the turbine section having airfoils disposed about a central axis of the gas turbine engine, each of the airfoils includes:
an airfoil section having an airfoil wall circumscribing an internal airfoil cavity and defining leading and trailing ends and pressure and suction sides, the airfoil wall being formed of a ceramic matrix composite (CMC) laminate comprised of fiber plies disposed in a ceramic matrix, the fiber plies including a skin fiber ply defining an exterior of the airfoil section and at least one inner fiber ply lining the skin fiber ply, the at least one inner fiber ply locally terminating at the leading end such that the airfoil wall has fewer of the fiber plies in the leading end than in each of the pressure side and the suction side, and the at least one inner fiber ply including multiple, non-consecutive fiber plies locally terminating at the leading end.

9. The gas turbine engine as recited in claim 8, wherein there are at least four of the fiber plies, and the at least one inner fiber ply includes an inner-most fiber ply.

10. The gas turbine engine as recited in claim 9, wherein the skin fiber ply circumscribes the internal airfoil cavity.

11. The gas turbine engine as recited in claim 8, wherein the first terminal end and the second terminal end are at an equivalent chord length position.

12. The gas turbine engine as recited in claim 8, wherein one or more of the fiber plies have a braided or woven fiber configuration.

* * * * *